United States Patent
Zhang et al.

(10) Patent No.: US 11,693,955 B2
(45) Date of Patent: Jul. 4, 2023

(54) METHOD FOR REMOTELY MONITORING HOST BASED ON CHIP-LEVEL PRIVACY-PRESERVING COMPUTATION (PPC)

(71) Applicant: Nanhu Laboratory, Huzhou (CN)

(72) Inventors: Lei Zhang, Huzhou (CN); Hao Liu, Huzhou (CN); Peng Gou, Huzhou (CN); Panpan Tang, Huzhou (CN); Feng Sha, Huzhou (CN); Jiachun Liao, Huzhou (CN)

(73) Assignee: Nanhu Laboratory, Huzhou (CN)

( * ) Notice: Subject to any disclaimer, the term of this patent is extended or adjusted under 35 U.S.C. 154(b) by 0 days.

(21) Appl. No.: 17/933,685

(22) Filed: Sep. 20, 2022

(65) Prior Publication Data

US 2023/0093018 A1 Mar. 23, 2023

(30) Foreign Application Priority Data

Sep. 22, 2021 (CN) .......................... 202111104191.2

(51) Int. Cl.
*H04L 29/06* (2006.01)
*G06F 21/53* (2013.01)
(Continued)

(52) U.S. Cl.
CPC .......... *G06F 21/53* (2013.01); *G06F 21/6209* (2013.01); *G06F 21/64* (2013.01); *G06F 2221/034* (2013.01)

(58) Field of Classification Search
CPC ....... G06F 21/53; G06F 21/6209; G06F 21/64
See application file for complete search history.

(56) References Cited

U.S. PATENT DOCUMENTS

2017/0185789 A1* 6/2017 Khosravi ............ H04L 63/0435
2018/0191491 A1* 7/2018 Chhabra ............... G06F 3/0623
(Continued)

FOREIGN PATENT DOCUMENTS

CN 112799914 5/2021

OTHER PUBLICATIONS

Chinese Patent Application No. 202111104191.2, Notification to Grant Patent Right for Invention, Nov. 30, 2021, 2 pages.
(Continued)

*Primary Examiner* — Vance M Little
(74) *Attorney, Agent, or Firm* — DLA Piper LLP (US)

(57) ABSTRACT

The present disclosure provides a remote host monitoring method based on chip-level privacy-preserving computation (PPC), including: S1: allowing monitoring software in a user-side host to start in a chip-level trusted execution environment (TEE); S2: determining whether the user-side host locally stores valid private data, directly going to step S4 if yes, or otherwise, going to step S3; S3: establishing a secure connection with a supervisor and capturing private data; and S4: allowing monitoring software running in the TEE to execute a related monitoring instruction based on the private data, encrypting and signing a monitoring result, and transmitting the monitoring result to the supervisor. The present disclosure ensures validity, tamper resistance and security of monitoring information of the user with a TEE based on PCC, encrypts and signs the monitoring information based on an encryption key and a signature key of the supervisor, can locally store the monitoring information.

20 Claims, 1 Drawing Sheet

(51) Int. Cl.
　　　*G06F 21/62*　　　(2013.01)
　　　*G06F 21/64*　　　(2013.01)

(56) References Cited

U.S. PATENT DOCUMENTS

| | | | |
|---|---|---|---|
| 2019/0140846 A1* | 5/2019 | Moore | H04L 9/0825 |
| 2019/0199695 A1* | 6/2019 | Bhardwaj | G06F 21/602 |
| 2019/0340393 A1* | 11/2019 | Mo | G06F 21/554 |
| 2020/0034528 A1* | 1/2020 | Yang | G06F 21/6209 |
| 2020/0036519 A1* | 1/2020 | Bitauld | H04L 9/0897 |
| 2020/0310662 A1* | 10/2020 | Staab | G06F 21/554 |

OTHER PUBLICATIONS

Chinese Patent Application No. 202111104191.2, First Office Action, 2021, 8 pages.

* cited by examiner

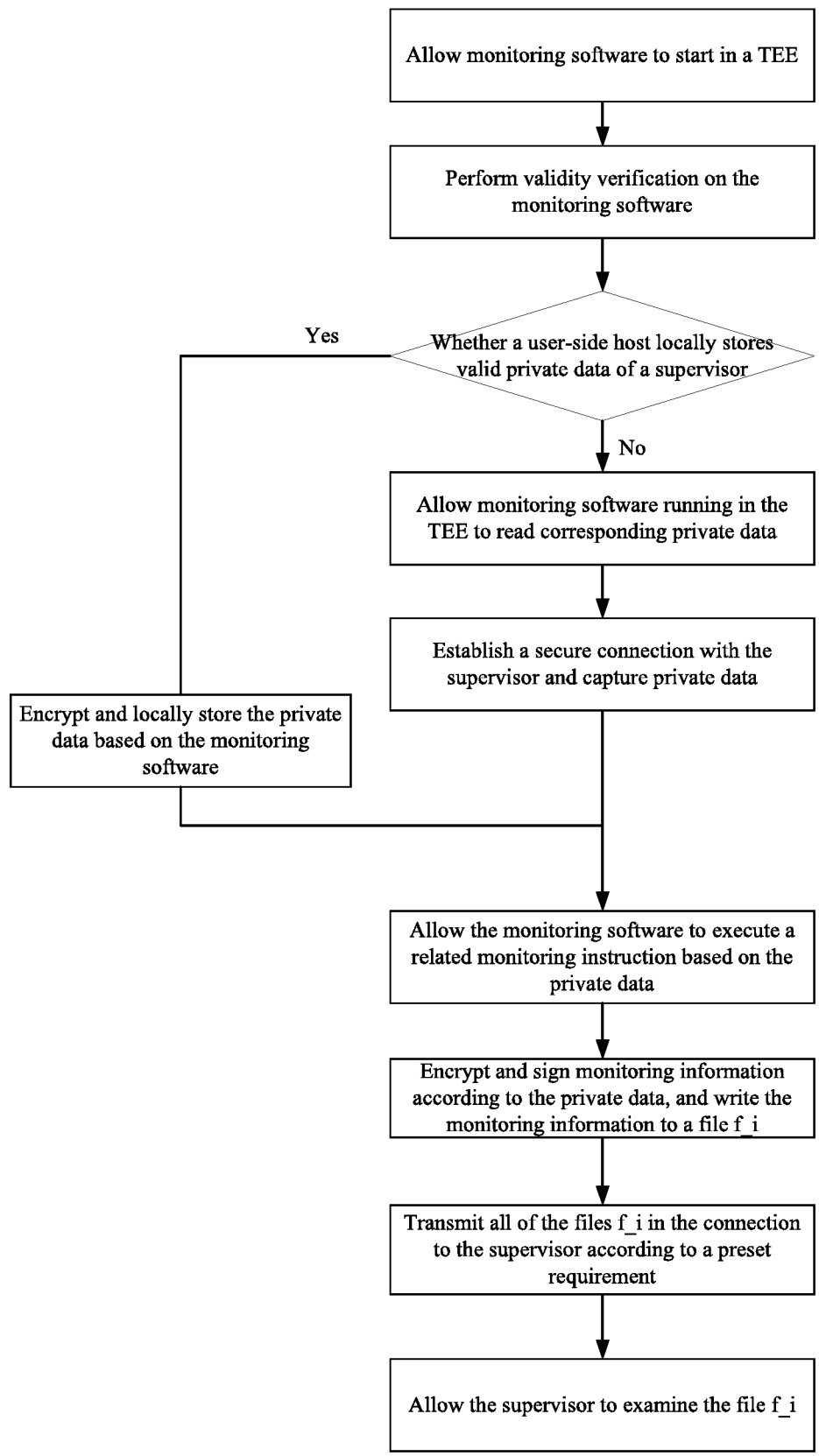

METHOD FOR REMOTELY MONITORING HOST BASED ON CHIP-LEVEL PRIVACY-PRESERVING COMPUTATION (PPC)

CROSS REFERENCE TO RELATED APPLICATION

This patent application claims the benefit and priority of Chinese Patent Application No. 202111104191.2, filed Sep. 22, 2021, the disclosure of which is incorporated by reference herein in its entirety as part of the present application.

TECHNICAL FIELD

The present disclosure belongs to the technical field of computer security, and particularly relates to a host monitoring method based on chip-level privacy-preserving computation (PPC).

BACKGROUND

Currently, supervisors remotely monitor all operating information of user-side hosts (such as operations of keyboards and mice, as well as some programs, file operating information and data of the user-side hosts) via monitoring software or services (hereinafter referred to as monitoring software), which is presented with some obvious defects, specifically:

The security is far from satisfactory. After remotely learning a user-side host, an attacker can obtain all data in operations of all software (including the monitoring software) through memory attacks (such as memory dump attack software). The attacker can freely make modifications and input wrong data (wrong monitoring data on operations of the keyboards and mice) to send to the supervisor. Even though the information is encrypted by the monitoring software, the attacker can also get a decryption key with memory attack software.

Data captured in monitoring is not stored locally by the user-side host. There is a need to establish a real-time connection between the supervisor and the user-side host, such that the supervisor receives the monitoring data from the monitoring software of the user-side host in real time. The real-time connection comes at a high overhead cost, resulting in a higher monitoring cost.

PPC based on a chip level (which mainly refers to a central processing unit (CPU) level) is one of the most cutting-edge technologies developed newly in the field of information security. Based on a chip-level trusted execution environment (TEE) of the trusted computing base (TCB), it is intended to make data privacy preservation secure and operations trusted in the TEE without the control from a system layer and a kernel layer (namely it is equivalent to the highest administration authority of a computer system, and even in a Kernel hierarchy, data and operations in the secure environment still cannot be viewed, tampered or controlled), such as the Intel software guard extension (SGX).

The CPU-level PPC mainly has the following two features:

1) The privacy preservation is strong: Encrypted data is only decrypted and computed in the CPU-level TEE (encrypted memory). Upon completion of computation, related data is destructed in the highly trusted environment, and decrypted plaintext data is not leaked in the whole process.

2) The computation is highly trusted: The computation is performed in the CPU-level TEE (encrypted memory), and no one (including the highest administrator for running the host or the owner having a control right for the Kernel hierarchy) can invade the CPU-level TEE to tamper the operations. The CPU-level TEE can generate a certificate (in the form of a digital signature) for the operations in the TEE, and can ensure the trustiness of a computed result.

Therefore, the security and trusted computing of the chip-level PPC provide technical bases to improve security of a remote host monitoring operation.

SUMMARY

In view of the above-mentioned problems, an objective of the present disclosure is to provide a remote host monitoring method based on chip-level PPC.

In order to achieve the above-mentioned objective, the present disclosure employs the following technical solutions:

A remote host monitoring method based on chip-level PPC includes the following steps:

S1: allowing monitoring software in a user-side host to start in a chip-level TEE;

S2: determining whether the user-side host locally stores valid private data, directly going to step S4 if yes, or otherwise, going to step S3;

S3: establishing a secure connection with a supervisor and capturing private data; and S4: allowing monitoring software running in the TEE to execute a related monitoring instruction based on the private data, encrypting and signing a monitoring result, and transmitting the monitoring result to the supervisor.

According to the remote host monitoring method based on chip-level PPC, in step S1, chip hardware for providing the TEE performs validity verification on monitoring software in a starting stage, and monitoring software passing through the verification is allowed to be started.

According to the remote host monitoring method based on chip-level PPC, in step S1, the chip hardware performs the validity verification by measuring a hash value of related memory data for loading the monitoring software.

According to the remote host monitoring method based on chip-level PPC, in step S1, the monitoring software is automatically started when the user-side host is booted or automatically started when a user logs in a corresponding client or manually started by the user.

According to the remote host monitoring method based on chip-level PPC, an application layer of the monitoring software, a called bottom function, and an operating system (OS) library may be all run in the TEE.

According to the remote host monitoring method based on chip-level PPC, step S3 specifically includes the following steps:

S31: allowing the chip hardware to sign the hash value of the related memory data for loading the monitoring software;

S32: sending a signature to the supervisor, such that the supervisor verifies the monitoring software according to the signature;

S33: establishing a secure encrypted connection between the supervisor and a TEE of the user-side host after verifying that the monitoring software is valid; and S34: allowing the supervisor to send the private data to the TEE through a secure encrypted connecting channel.

According to the remote host monitoring method based on chip-level PPC, step S3 further includes: allowing, upon receiving the private data, the chip hardware to locally store the private data with a trusted storage technology based on the corresponding monitoring software; and step S4 includes: allowing, if the user-side host locally stores the valid private data, the corresponding monitoring software running in the TEE to securely read the corresponding locally-stored private data and execute the related monitoring instruction based on the private data; and directly executing, if the user-side host does not locally store the valid private data, the related monitoring instruction based on private data captured in the connection.

According to the remote host monitoring method based on chip-level PPC, the private data includes an encryption key K of the supervisor, a signature key (private key) S of the supervisor, monitoring time t, dt, and a monitoring action m; and in step S4, the monitoring software determines, based on the monitoring time t and the dt, when to execute the monitoring action and how often to write monitoring information to a file f_i; and determines, based on the monitoring action m, what monitoring instruction is executed during execution of the monitoring action.

According to the remote host monitoring method based on chip-level PPC, in step S4, the monitoring result is encrypted and signed in a following way:

encrypting the monitoring result with the encryption key K of the supervisor, signing the monitoring result with the signature key (private key) S of the supervisor, and writing both encrypted information and a signature value to the file f_i.

According to the remote host monitoring method based on chip-level PPC, step S4 further includes: allowing the user-side host to transmit all of the monitoring files f_i in the connection to the supervisor according to a preset requirement of the supervisor, where when a real-time request of the supervisor is received, the monitoring file f_i generated each time is transmitted to the supervisor in real time.

The present disclosure has the following advantages:

1. The present disclosure ensures validity, tamper resistance and security of monitoring information of the user with a TEE based on PCC, and can solve the problem of unsatisfactory security of the existing remote monitoring.

2. The present disclosure encrypts and signs the monitoring information based on an encryption key and a signature key of the supervisor, can locally store the monitoring information, and can flexibly send monitoring data to the supervisor in time or in real time as required by the supervisor. The present disclosure does not need to send the monitoring data to the supervisor in real time for prevention of an attack and a tamper, thereby avoiding a high overhead cost caused by a real-time connection.

3. The private data is stored locally with a trusted storage technology, and is unstealable to any person or any program except corresponding monitoring software in the TEE, which ensures the security of the private data. Moreover, since the private data is stored securely, and the monitoring software can read the local private data trustfully, there is no need to reestablish a connection with the supervisor whenever the monitoring software is started, thereby making the monitoring more flexible, and further reducing the monitoring cost.

BRIEF DESCRIPTION OF THE DRAWINGS

FIG. 1 is a flowchart of a remote host monitoring method based on chip-level PPC according to the present disclosure.

DETAILED DESCRIPTION OF THE EMBODIMENTS

The present disclosure will be further described in detail below with reference to the accompanying drawings and specific embodiments.

An embodiment provides a remote host monitoring method based on chip-level PPC, including the following steps:

S1: Allow monitoring software in a user-side host to start in a chip-level TEE.

S2: Determine whether the user-side host locally stores valid private data, directly go to Step S4 if yes, or otherwise, go to Step S3.

S3: Establish a secure connection with a supervisor and capture private data.

S4: Allow monitoring software running in the TEE to execute a related monitoring instruction based on the private data, encrypting and signing a monitoring result, and transmitting the monitoring result to the supervisor.

Specifically, in Step S1, the monitoring software is automatically started when the user-side host is booted or automatically started when a user logs in a corresponding client or manually started by the user. Chip hardware for providing the TEE performs validity verification on monitoring software in a starting stage. Monitoring software passing through the verification is allowed to be started, or otherwise, an alarm is given. The chip hardware mainly performs the validity verification by measuring a hash value of related memory data for loading the monitoring software, thereby verifying that the monitoring software is issued by a legal supervisor and is not tampered.

In Step S2, the monitoring software passing through the verification is started formally. If there is no valid private data, it is possible that the user-side host hasn't established a connection with the supervisor and thus no locally-stored private data of the supervisor needs to be captured. Alternatively, the user-side host has established a connection with the supervisor, but private data of the supervisor is updated and a connection needs to be established to recapture the private data. If there is not the locally-stored private data, the user can make a direct determination. If there is the locally-stored private data, but the supervisor requires to update the private data, namely the private data of the supervisor is updated, no valid private data is stored locally, and a connection needs to be established to recapture the valid private data, the supervisor can require the user-side host to update the private data in a way of sending update request information and the like to the user-side host. The specific way is not limited herein.

Certainly, as required by the supervisor, the connection can also be established whenever the user-side host is booted or the client is logged in, so as to recapture the private data.

Specifically, Step S3 specifically includes:

S31: Allow the chip hardware to sign the hash value of the related memory data for loading the monitoring software.

S32: Send a signature to the supervisor, such that the supervisor verifies, according to the signature, that the monitoring software is valid and runs in the TEE. This step can be realized based on technologies such as Intel SGX Remote Attestation.

S33: Establish a secure encrypted connection between the supervisor and a TEE of the user-side host after verifying that the monitoring software is valid.

S34: Allow the supervisor to send the private data to the TEE through a secure encrypted connecting channel. The user cannot intercept, check, and tamper the private data.

The private data mainly includes an encryption key K of the supervisor, a signature key (private key) S of the supervisor, monitoring time t, dt, and a monitoring action m. The monitoring action may be an input from a mouse or a keyboard, a program, state information of a folder, etc.

S35: allow, upon receiving the private data, the chip hardware to locally store the private data with a trusted storage technology based on the corresponding monitoring software. The trusted storage technology may be the Intel SGX Sealing. The private data is mainly stored and read as follows: A key is randomly generated in the TEE of the chip hardware. Certainly, the key is invisible to the outside. The private data is encrypted and stored with the key, and in the TEE, the key is associated with the hash value of the memory data for loading the corresponding monitoring software. When the monitoring software requests to read the private data, the TEE verifies the hash value of the memory data for loading the monitoring software. Only by verifying that the hash value is a hash value associated with the key can the corresponding key be started and the private data be decrypted and read. Therefore, only the corresponding monitoring software running in the TEE can load and read the stored private data trustfully.

It is also proposed to further associate the key with information such as present CPU information and TEE information. In this way, when the private data is read, the TEE verifies the present CPU information, the TEE information, the hash value of the memory data for loading the monitoring software and other associated information. Only that the information is verified successfully, the corresponding key can be started and the private data can be read. With the solution, the security of the private data can further be improved. For example, the private data can only be loaded and read trustfully by corresponding monitoring software running in the host and running in the TEE of the host, but not by the user or even the highest administrator or monitoring software running out of the TEE, or other software running in the TEE without storing corresponding private data, thereby ensuring the security of the locally-stored private data. Therefore, in next restart, namely when the monitoring software is restarted in the TEE, the locally-stored private data can be loaded automatically and securely, and there is no need to establish the connection with the supervisor each time.

The above solution is implemented based on a premise that the stored private data can only be read by the corresponding monitoring software. However, in use of the remote host monitoring method, some modifications can be made. For example, instead of the hash value of the memory data for loading the monitoring software, the signature from the developer of the monitoring software is associated with the key. In this way, other versions of monitoring software provided by the same software developer can also read the stored private data.

S36: Disconnect, after capturing the private data, the supervisor and the user-side host, and go to Step S4.

Further, Step S4 specifically includes:

S41: Directly execute, if the user-side host does not locally store the valid private data, the related monitoring instruction based on private data captured in the connection.

Allow, if the user-side host locally stores the valid private data, the corresponding monitoring software running in the TEE to securely read the corresponding locally-stored private data and execute the related monitoring instruction based on the private data. For example, the monitoring software determines, based on the monitoring time t and the dt, when to execute the monitoring action and how often to write monitoring information to a file f_i; and determines, based on the monitoring action m, what monitoring instruction is executed during execution of the monitoring action.

S42: Encrypt, before writing monitoring information to the file f_i, the monitoring information with the encryption key K of the supervisor, sign the monitoring information with the signature key (private key) S of the supervisor, and write both encrypted information and a signature value to the file f_i.

S43: Allow the user-side host to transmit all of the monitoring files f_i in the connection to the supervisor according to a preset requirement. The monitoring file may be transmitted by a network, and may also be transmitted in other in-site ways, such as a universal serial bus (USB) copying way. The preset requirement may be time set by the supervisor, for example, time when the user exits the client, time when a number of the monitoring files f_i reaches a certain value, etc.

Upon receiving the monitoring file f_i, the supervisor calculates whether the monitoring file is as expected. The supervisor verifies the monitoring file with a public key corresponding to the signature key (private key) S of the supervisor, to testify that the file is not counterfeited. Upon completion of verification, the supervisor reads encrypted information, decrypts it with the encryption key K of the supervisor to obtain a plaintext of the monitoring information, and determines whether a measured time tag is as expected (for example, whether the monitoring starts at specified monitoring time, and whether a record is made and written to the monitoring file at the time interval dt). In case of immaterial problems such as the signature on the file received by the supervisor is verified with an error, or the time tag included in the decrypted file is not as expected, or a finally received file is less than N (N is an expected value pre-calculated by the supervisor according to related setting parameters, and the file is less than N when the monitoring software is shut down forcibly or is not started), it is determined that the user is guilty of a class-A violation. The decrypted monitoring file is examined, for example, based on information of all mice, keyboards and other operations, to reproduce all operating scenarios of the user. In case of a problem in examination, it is determined that the user is guilty of a class-B violation.

Further, in case of a real-time requirement of the supervisor, the monitoring file f_i generated each time is transmitted to the supervisor in real time. The real time herein includes quasi-real time in unconventional meaning. Since the security of the monitoring data stored by the supervisor can be ensured, and the monitoring data is sent to the supervisor in real time in the form of the monitoring file, the supervisor can flexibly set a real-time degree as required according to the dt in the private data, and unnecessarily send the monitoring data in quasi-real time or uniformly real time, which can meet the real-time requirement of the supervisor, and can reduce the overhead of the real-time connection.

Preferably, an application layer of the monitoring software, a called bottom function, and an OS library are all run in the TEE, to ensure their security.

According to the solution, the monitoring software is run in a TEE based on underlying hardware (CPU), and the attacker neither invades read and encrypted memory data by reading a memory, nor interferes or tampers the operation of the monitoring software. Moreover, the monitoring data is encrypted, signed and stored in the highly trusted environment, and both the user and the attacker cannot read the encryption key and the signature key in the highly trusted environment and cannot read and tamper the locally-stored monitoring data, all of which can ensure the trustiness of the monitoring data. Without being read and tampered, related monitoring data can be stored locally upon the encryption and signature, and sent to the supervisor offline or online according to the preset requirement of the supervisor, which makes the monitoring more flexible. Meanwhile, there is no need to establish the real-time data connection between the supervisor and the user-side host, thereby effectively reducing the monitoring cost. The supervisor can conveniently and flexibly set time to be monitored, and a time interval at which the monitoring information is written to the file. Within a monitoring time period, the monitoring software running in the highly trusted environment generates a plurality of files as required by the supervisor, which can be read segmentally by the supervisor for time-sharing management.

The specific embodiments described herein are merely intended to illustrate the spirit of the present disclosure by way of examples. Those skilled in the art can make various modifications or supplements to the specific embodiments described or replace them in a similar manner, but it may not depart from the spirit of the present disclosure or the scope defined by the appended claims.

Although terms such as the user-side host, monitoring software, chip hardware, TEE, private data, and supervisor are used extensively herein, the possibility of using other terms is not excluded. The terms are only intended to describe and explain the essence of the present disclosure more conveniently. It is contrary to the spirit of the present disclosure to interpret these terms as any additional limitation.

What is claimed is:

1. A remote host monitoring method based on chip-level privacy-preserving computation (PPC), comprising the following steps:
    S1: allowing monitoring software in a user-side host to start in a chip-level trusted execution environment (TEE);
    S2: determining whether the user-side host locally stores valid private data, directly going to step S4 if yes, or otherwise, going to step S3;
    wherein the determining comprises that if the user-side host locally does not establish a connection with a supervisor and no locally-stored private data of the supervisor needs to be captured, or the user-side host locally has established a connection with the supervisor, but the private data of the supervisor needs to be updated and the connection needs to be established to recapture the private data, and then the user-side host locally stores noin valid private data; otherwise, the user-side host locally stores valid private data;
    S3: establishing a secure connection with the supervisor and capturing private data; and
    S4: allowing monitoring software running in the TEE to execute a related monitoring instruction based on the private data, encrypting and signing a monitoring result, and transmitting the monitoring result to the supervisor;
    wherein step S3 comprises:
        allowing, upon receiving the private data, chip hardware to locally store the private data with a trusted storage technology based on a corresponding monitoring software, wherein a key is generated in a TEE of the chip hardware, the private data is encrypted and stored with the key, and in the TEE, the key is associated with a hash value of memory data for loading the corresponding monitoring software; and
        when the monitoring software requests to read the private data, the TEE verifies the hash value of the memory data for loading the monitoring software, and verifies that when the hash value is a hash value associated with the key, the corresponding key is used to decrypt and read the private data;
    wherein the private data comprises an encryption key K of the supervisor, a signature key (private key) S of the supervisor, monitoring time t, dt, and a monitoring action m; and
    wherein, in step S4, the monitoring result is encrypted and signed in a following way:
    encrypting the monitoring result with the encryption key K of the supervisor, signing the monitoring result with the signature key (private key) S of the supervisor, and writing both encrypted information and a signature value to a file f_i.

2. The remote host monitoring method based on chip-level PPC according to claim 1, wherein in step S1, the chip hardware for providing the TEE performs validity verification on monitoring software in a starting stage, and monitoring software passing through the verification is allowed to be started.

3. The remote host monitoring method based on chip-level PPC according to claim 2, wherein in step S1, the chip hardware performs the validity verification by measuring the hash value of the related memory data for loading the monitoring software.

4. The remote host monitoring method based on chip-level PPC according to claim 3, wherein in step S1, the monitoring software is automatically started when the user-side host is booted or automatically started when a user logs in a corresponding client or manually started by the user.

5. The remote host monitoring method based on chip-level PPC according to claim 1, wherein an application layer of the monitoring software, a called bottom function, and an operating system (OS) library are all run in the TEE.

6. The remote host monitoring method based on chip-level PPC according to claim 1, wherein step S3 comprises the following steps:
    allowing the chip hardware to sign the hash value of the related memory data for loading the monitoring software;
    sending a signature to the supervisor, such that the supervisor verifies the monitoring software according to the signature;
    establishing a secure encrypted connection between the supervisor and the TEE of the user-side host after verifying that the monitoring software is valid; and
    allowing the supervisor to send the private data to the TEE through a secure encrypted connecting channel.

7. The remote host monitoring method based on chip-level PPC according to claim 6, wherein step S4 comprises:
    allowing, if the user-side host locally stores the valid private data, the corresponding monitoring software running in the TEE to securely read the corresponding locally-stored private data and execute the related monitoring instruction based on the private data; and
    directly executing, if the user-side host does not locally store the valid private data, the related monitoring instruction based on private data captured in the connection.

8. The remote host monitoring method based on chip-level PPC according to claim 7, wherein in step S4, the monitoring software determines, based on the monitoring time t and the dt, when to execute the monitoring action and how often to write monitoring information to the file f_i; and determines, based on the monitoring action m, what monitoring instruction is executed during execution of the monitoring action.

9. The remote host monitoring method based on chip-level PPC according to claim 8, wherein in step S4 further comprises: allowing the user-side host to transmit all of the monitoring files f_i in the connection to the supervisor according to a preset requirement of the supervisor, wherein
when a real-time request of the supervisor is received, the monitoring file f_i generated each time is transmitted to the supervisor in real time.

10. The remote host monitoring method based on chip-level PPC according to claim 6, wherein in step S1, the chip hardware for providing the TEE performs validity verification on monitoring software in a starting stage, and monitoring software passing through the verification is allowed to be started.

11. The remote host monitoring method based on chip-level PPC according to claim 10, wherein in step S1, the chip hardware performs the validity verification by measuring the hash value of the related memory data for loading the monitoring software.

12. The remote host monitoring method based on chip-level PPC according to claim 11, wherein in step S1, the monitoring software is automatically started when the user-side host is booted or automatically started when a user logs in a corresponding client or manually started by the user.

13. The remote host monitoring method based on chip-level PPC according to claim 12, wherein step S4 comprises:
allowing, if the user-side host locally stores the valid private data, the corresponding monitoring software running in the TEE to securely read the corresponding locally-stored private data and execute the related monitoring instruction based on the private data; and
directly executing, if the user-side host does not locally store the valid private data, the related monitoring instruction based on private data captured in the connection.

14. The remote host monitoring method based on chip-level PPC according to claim 13, wherein in step S4, the monitoring software determines, based on the monitoring time t and the dt, when to execute the monitoring action and how often to write monitoring information to the file f_i; and determines, based on the monitoring action m, what monitoring instruction is executed during execution of the monitoring action.

15. The remote host monitoring method based on chip-level PPC according to claim 11, wherein step S4 comprises:
allowing, if the user-side host locally stores the valid private data, the corresponding monitoring software running in the TEE to securely read the corresponding locally-stored private data and execute the related monitoring instruction based on the private data; and
directly executing, if the user-side host does not locally store the valid private data, the related monitoring instruction based on private data captured in the connection.

16. The remote host monitoring method based on chip-level PPC according to claim 15, wherein in step S4, the monitoring software determines, based on the monitoring time t and the dt, when to execute the monitoring action and how often to write monitoring information to the file f_i; and determines, based on the monitoring action m, what monitoring instruction is executed during execution of the monitoring action.

17. The remote host monitoring method based on chip-level PPC according to claim 11, wherein step S4 comprises:
allowing, if the user-side host locally stores the valid private data, the corresponding monitoring software running in the TEE to securely read the corresponding locally-stored private data and execute the related monitoring instruction based on the private data; and
directly executing, if the user-side host does not locally store the valid private data, the related monitoring instruction based on private data captured in the connection.

18. The remote host monitoring method based on chip-level PPC according to claim 15, wherein in step S4, the monitoring software determines, based on the monitoring time t and the dt, when to execute the monitoring action and how often to write monitoring information to the file f_i; and determines, based on the monitoring action m, what monitoring instruction is executed during execution of the monitoring action.

19. The remote host monitoring method based on chip-level PPC according to claim 6, wherein an application layer of the monitoring software, a called bottom function, and an operating system (OS) library are all run in the TEE.

20. The remote host monitoring method based on chip-level PPC according to claim 19, wherein step S4 comprises:
allowing, if the user-side host locally stores the valid private data, the corresponding monitoring software running in the TEE to securely read the corresponding locally-stored private data and execute the related monitoring instruction based on the private data; and
directly executing, if the user-side host does not locally store the valid private data, the related monitoring instruction based on private data captured in the connection.

* * * * *